(12) United States Patent
Takada et al.

(10) Patent No.: US 9,568,051 B2
(45) Date of Patent: Feb. 14, 2017

(54) SPRING TYPE ONE-WAY CLUTCH

(71) Applicants: Seiichi Takada, Mie (JP); Chiyori Satou, Mie (JP)

(72) Inventors: Seiichi Takada, Mie (JP); Chiyori Satou, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/791,618

(22) Filed: Jul. 6, 2015

(65) Prior Publication Data

US 2015/0308520 A1 Oct. 29, 2015

Related U.S. Application Data

(62) Division of application No. 13/984,882, filed as application No. PCT/JP2012/052353 on Feb. 2, 2012, now Pat. No. 9,309,935.

(30) Foreign Application Priority Data

Feb. 18, 2011 (JP) ................. 2011-033494

(51) Int. Cl.
  *F16D 41/20* (2006.01)
  *F16D 48/00* (2006.01)
  *F16D 41/12* (2006.01)

(52) U.S. Cl.
  CPC ............ *F16D 41/203* (2013.01); *F16D 41/12* (2013.01); *F16D 41/20* (2013.01); *F16D 41/206* (2013.01);
  (Continued)

(58) Field of Classification Search
  CPC ......... F16D 41/203; F16D 48/00; F16D 41/20
  See application file for complete search history.

(56) References Cited

U.S. PATENT DOCUMENTS 2,895,578 A * 7/1959 Winchell ............. F16D 41/206
  192/41 S
3,242,696 A * 3/1966 Kaplan ................. F16D 7/022
  192/41 R
(Continued)

FOREIGN PATENT DOCUMENTS

JP  63-006229  1/1988
JP  4-246086  9/1992
(Continued)

OTHER PUBLICATIONS

International Search Report mailed Apr. 24, 2012 in International (PCT) Application No. PCT/JP2012/052353.
(Continued)

*Primary Examiner* — Ramya Burgess
*Assistant Examiner* — Mark Manley
(74) *Attorney, Agent, or Firm* — Wenderoth, Lind & Ponack, L.L.P.

(57) ABSTRACT

A spring type one-way clutch includes an outer ring rotatable about a rotary shaft and having an inner tubular portion, and a clutch spring mounted in the outer ring. The clutch spring includes a large-diameter coil spring portion, a transition portion connected to the winding end of the large-diameter coil spring portion, and a small-diameter coil spring portion connected to the radially inner end of the transition portion and wound in the opposite direction from the large-diameter coil spring portion. When the outer ring is rotated in the direction opposite the winding direction of the large-diameter coil spring portion, the large- and small-diameter coil spring portions are radially compressed and pressed against the inner tubular portion and the rotary shaft, allowing the rotary shaft to rotate together with the outer ring. The transition portion spirals radially inwardly in the winding direction of the large-diameter coil spring portion.

4 Claims, 15 Drawing Sheets

(52) U.S. Cl.
CPC ............ *F16D 48/00* (2013.01); *E05Y 2201/49* (2013.01); *E05Y 2800/205* (2013.01); *E05Y 2800/22* (2013.01)

(56) References Cited

U.S. PATENT DOCUMENTS

| | | |
|---|---|---|
| 4,090,785 A | 5/1978 | Weninger |
| 4,763,764 A | 8/1988 | Smith |

FOREIGN PATENT DOCUMENTS

| | | |
|---|---|---|
| JP | 4-122822 | 11/1992 |
| JP | 2005-233305 | 9/2005 |
| JP | 2005-249144 | 9/2005 |
| JP | 2008-032142 | 2/2008 |
| JP | 2008-101740 | 5/2008 |
| JP | 2009-127782 | 6/2009 |

OTHER PUBLICATIONS

Written Opinion of the International Searching Authority mailed Apr. 24, 2012 in International (PCT) Application No. PCT/JP2012/052353.

"Machine Element Utilization Manual-Spring", edited by Nippatsu-NHK Spring Co., Ltd, published Feb. 15, 1995, p. 136.

\* cited by examiner

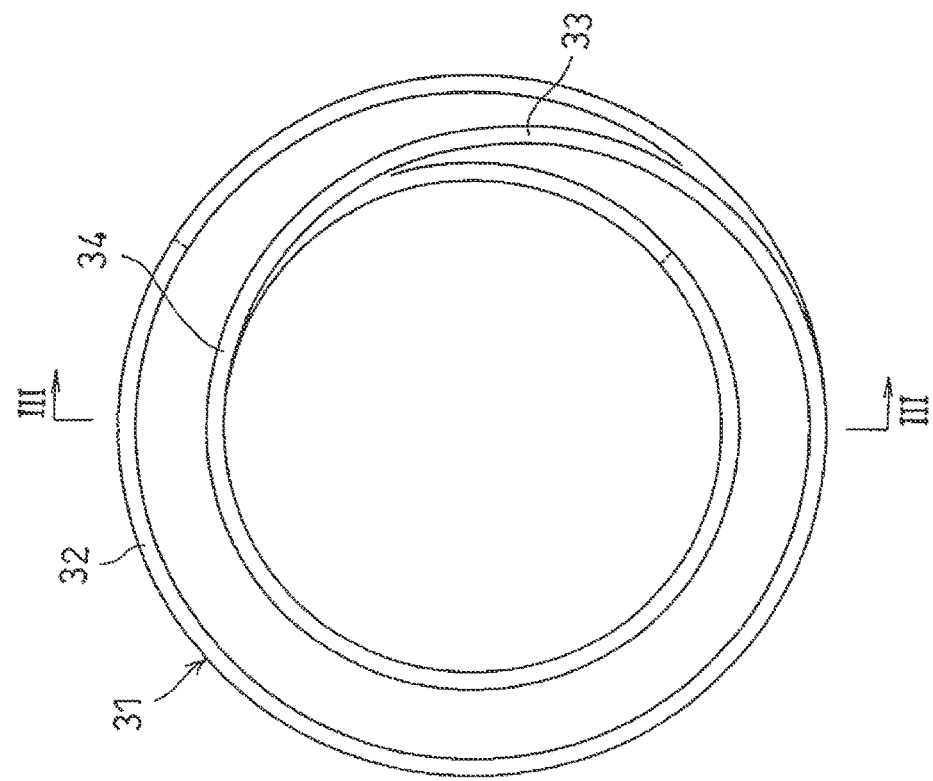
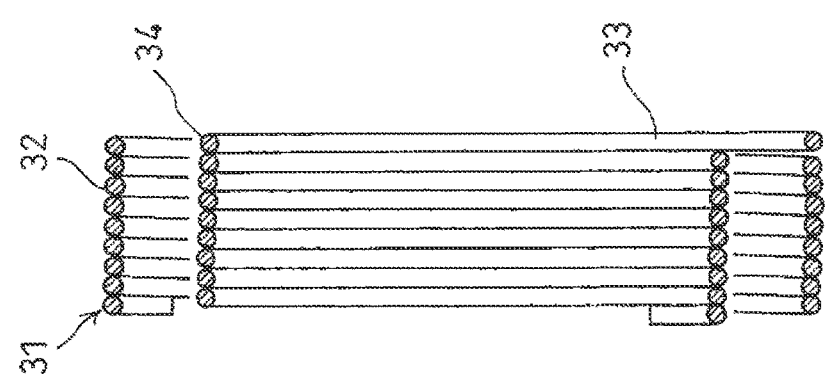

SPRING TYPE ONE-WAY CLUTCH

TECHNICAL FIELD

This invention relates to a spring type one-way clutch configured to transmit the rotation of a driving member in one direction to a driven member.

BACKGROUND ART

One-way clutches used e.g. in paper feeders of printers, copiers, facsimile machines, etc. include spring type clutches, which include a clutch spring adapted to be selectively pressed against and released from a driving or driven member, thereby selectively transmitting torque.

Spring type one-way clutches include those having a clutch spring in the form of a single-layered spring, as disclosed in "Machine element utilization manual-Spring", edited by Nippatsu-NHK Spring Co., Ltd, published Feb. 15, 1995, page 136, and JP Patent Publication 63-6229A, and those having a double-layered clutch spring, as disclosed in JP Patent Publication 2008-101740A.

A single-layered spring type one-way clutch includes a driving shaft (driving arbor), a driven shaft (driven arbor) coaxial with the driving shaft, and a spring fitted over the end portions of both shafts such that when the driving shaft is rotated in one direction, the spring is radially compressed and pressed against both shafts, thereby transmitting the rotation of the driving shaft in the one direction to the driven shaft. One drawback of this type of clutches is their small torque transmission capacity. If it is desired to transmit larger torque, it is necessary to use a clutch spring with a large number of turns, which increases the size of the one-way clutch.

A double-layered spring type one-way clutch includes a double-layered clutch spring including a large-diameter coil spring portion kept in elastic contact with a clutch surface formed on the inner periphery of the driving ring, and a small-diameter coil spring portion kept in elastic contact with a clutch surface formed on the outer periphery of the driven ring such that when the driving ring is rotated in one direction, the large-diameter coil spring portion is radially expanded while the small-diameter coil spring portion is radially compressed, whereby the large-diameter coil spring portion and the small-diameter coil spring portion are pressed against the respective clutch surfaces of the driving ring and the driven ring. The driving ring is thus coupled to the driven ring and the torque of the driving ring in the above-mentioned one direction is transmitted to the driven ring. This one-way clutch is thus large in torque transmission capacity while its axial length is small.

While the double-layered spring type one-way clutch disclosed in JP Patent Publication 2008-101740A is short in axial length, since the large-diameter coil spring portion and the small-diameter coil spring portion are connected together through a U-shaped transition portion, i.e. a portion bent by 180°, a relatively large stress tends to be repeatedly applied to the small bent portion of the transition portion which is bent with a small radius of curvature every time rotation is transmitted from the driving ring to the driven ring. Stress thus tends to accumulate in the transition portion, increasing the possibility of damage to the transition portion due to fatigue. The durability of such a clutch spring is therefore not sufficient.

SUMMARY OF THE INVENTION

An object of the present invention is to improve the durability of the clutch spring used in a double-layered spring type one-way clutch, which is characterized by its short axial length.

In order to achieve this object, the present invention provides, firstly, a spring type one-way clutch comprising a tubular outer member including an inwardly extending flange at a first end of the outer member and having an opening at a second end of the outer member, an inner member inserted in the outer member so as to be coaxial with the outer member, a clutch spring mounted between a radially inner surface of the outer member and a radially outer surface of the inner member, and a lid closing the opening of the outer member, wherein the inwardly extending flange of the outer member has an inner tubular portion on an inner side surface of the flange, wherein the clutch spring comprises a large-diameter coil spring portion fitted on a radially outer surface of the inner tubular portion with an interference fit, a transition portion extending radially inwardly from a winding end point of the large-diameter coil spring portion in a spiraling pattern in a direction in which the large-diameter coil spring portion is wound, and a small-diameter coil spring portion extending from a radially inner end of the transition portion so as to be located in the large-diameter coil spring portion, wherein the small-diameter coil spring portion is wound in a direction different from the direction in which the large-diameter coil spring portion is wound, and wherein the small-diameter coil spring portion is fitted on a cylindrical radially outer surface of the inner member with an interference fit.

With this spring type one-way clutch, one of the outer member and the inner member is used to drive the other. If the outer member is rotated, as the driving member, in the direction opposite to the direction in which the large-diameter coil spring portion is wound, the large-diameter coil spring portion is radially compressed and pressed hard against the radially outer surface of the inner tubular portion, so that the large-diameter coil spring portion rotates together with the outer member, and its rotation is transmitted to the small-diameter coil spring portion through the transition portion.

At this time, since the large-diameter coil spring portion and the small-diameter coil spring portion are wound in different directions from each other, the small-diameter coil spring portion is radially compressed and pressed hard against the cylindrical radially outer surface of the inner member. Thus, the rotation of the outer member is transmitted to the inner member through the clutch spring, so that the inner member rotates in the same direction as the outer member.

When, conversely, the outer member is rotated in the direction in which the large-diameter coil spring portion is wound, if the force with which the large-diameter coil spring portion is pressed is smaller than the force with which the small-diameter coil spring portion is pressed, the large-diameter coil spring portion is radially expanded until slip occurs between the contact portions of the large-diameter coil spring portion and the inner tubular portion. In this state, the outer member rotates alone with its rotation not transmitted to the clutch spring and thus to the inner member.

While torque is being transmitted from the outer member to the inner member, stress corresponding to the toque being transmitted is applied to the transition portion of the clutch spring. But since the transition portion extends radially inwardly from the winding end point of the large-diameter coil spring portion in a spiraling pattern in the direction in which the large-diameter coil spring portion is wound, there will be no local stress concentration on the transition portion, which in turn prevents damage to the transition portion due to fatigue.

If the inner member is used as the driving member, when the inner member is rotated in the direction in which the small-diameter coil spring portion is wound, the small-diameter coil spring portion is radially compressed and pressed against the cylindrical radially outer surface of the inner member, thus allowing the small-diameter coil spring portion to rotate together with the inner member. The rotation of the small-diameter coil spring portion is transmitted to the large-diameter coil spring portion through the transition portion. The large-diameter coil spring portion is thus radially compressed and pressed hard against the radially outer surface of the inner tubular portion. As a result, the rotation of the inner member is transmitted to the outer member through the clutch spring, and the outer member rotates in the same direction as the inner member.

In this case too, there will be no local stress concentration on the transition portion, which prevents damage to the transition portion due to fatigue.

With the spring type one-way clutch according to the above-described first invention, the inner tubular portion may have an axial length determined such that a gap is defined between the distal end surface of the inner tubular portion and the inner side surface of the lid in which the transition portion of the clutch spring is inserted. Or otherwise, the inner tubular portion may have an axial length determined such that the distal end surface of the inner tubular portion abuts the inner side surface of the lid, or the distal end surface of the inner tubular portion axially faces the inner side surface of the lid with a minute gap left therebetween.

In the former arrangement, in which the gap is defined between the lid and the inner tubular portion in which the transition portion can be received, it is not necessary to form a spiral groove in the distal end surface of the inner tubular portion in which the transition portion can be received. This reduces the manufacturing cost accordingly.

If the axial length of the inner tubular portion is determined such that the distal end surface of the inner tubular portion abuts the inner side surface of the lid, or the distal end surface of the inner tubular portion axially faces the inner side surface of the lid with a minute gap left therebetween, a spiral groove is formed in the distal end surface of the inner tubular portion in which the transition portion is received. With this arrangement, stress applied to the transition portion is received by the inner wall of the spiral groove, so that it is possible to more effectively prevent damage to the transition portion.

Preferably, the lid has an annular protrusion formed on the inner side surface of the lid and fitted in a distal end portion of the inner tubular portion. With this arrangement, this annular protrusion supports the distal end of the inner tubular portion, thus increasing the rigidity of the inner tubular portion. This prevents deformation of and damage to the inner tubular portion, so that the large-diameter coil spring portion can reliably bind the radially outer surface of the inner tubular portion when radially compressed. As a result, it is possible to prevent slip between contact portions of the inner tubular portion and the large-diameter coil spring portion, thereby reliably transmitting torque therebetween.

Further preferably, the large-diameter coil spring portion of the clutch spring has a hook formed at the winding start point of the large-diameter coil spring portion and kept in engagement with the outer member. With this arrangement, if the outer member is used as the driving member, the rotation of the outer member can be reliably transmitted to the large-diameter coil spring portion. While the one-way clutch is in the position where the rotation of the outer member is not supposed to be transmitted to the inner member, slip occurs only between the contact portions of the small-diameter coil spring portion and the cylindrical radially outer surface of the inner member. Thus, it is possible to prevent slippage at any other portion of the clutch.

Thus, even if the outer member is made of synthetic resin and thus is lower in hardness than the inner member, which is made of metal, it is possible to prevent wear of the soft outer member due to contact with the clutch spring.

In one arrangement of the spring type one-way clutch according to the first invention, the outer member is configured to drive the inner member, the inner member is a rotary shaft inserted in the outer member, the one-way clutch further includes a ratchet wheel rotatably mounted around the rotary shaft, and a ratchet pawl which can be selectively brought into and out of engagement with the ratchet wheel, thereby selectively allowing and prohibiting rotation of the ratchet wheel, and the small-diameter coil spring portion has an engaging piece formed at its winding end point and kept in engagement with the ratchet wheel. With this arrangement, while the rotation of the ratchet wheel is being stopped, the small-diameter coil spring portion of the clutch spring cannot be radially compressed. Thus, it is possible to selectively transmit, and not transmit, rotation from the outer member to the inner member by selectively allowing and prohibiting rotation of the ratchet wheel.

In order to improve the durability of the clutch spring, the spring type one-way clutch according to the second invention comprises a stationary shaft, a tubular driving member rotatable about the stationary shaft, a tubular driven member provided on one axial side of the driving member and rotatable about the stationary shaft, and a clutch spring mounted in the driving member, wherein the driven member has a cylindrical portion formed on a side surface of the driven member facing the driving member and inserted in the driving member, wherein the clutch spring comprises a large-diameter coil spring portion mounted in the driving member in a radially compressed state and kept in elastic contact with a cylindrical radially inner surface of the driving member, a transition portion extending radially inwardly from a winding end point of the large-diameter coil spring portion in a spiraling pattern in a direction in which the large-diameter coil spring portion is wound, and a small-diameter coil spring portion connected to a radially inner end of the transition portion and located in the large-diameter coil spring portion, and wherein the small-diameter coil spring portion is wound in a direction different from the direction in which the large-diameter coil spring portion is wound, and is mounted in the cylindrical portion in a radially compressed state so as to be kept in elastic contact with a radially inner surface of the cylindrical portion.

With this spring type one-way clutch, when the driving member is rotated in the direction in which the large-diameter coil spring portion is wound, the large-diameter coil spring portion is radially expanded and pressed against the cylindrical radially inner surface of the driving member. The large-diameter coil spring portion thus rotates in the same direction as the driving member. The rotation of the large-diameter coil spring portion is transmitted to the small-diameter coil spring portion through the transition portion, thus radially expanding the small-diameter coil spring portion until pressed against the radially inner surface of the inner tubular portion. The rotation of the driving member is thus transmitted to the driven member through the clutch spring, and the driven member is rotated in the same direction as the driving member.

According to the second invention too, while torque is being transmitted from the driving member to the driven member, stress corresponding to the torque being transmitted is applied to the transition portion of the clutch spring. But since the transition portion extends radially inwardly from the winding end point of the large-diameter coil spring portion, which rotates together with the outer member, in a spiraling pattern in the direction in which the large-diameter coil spring portion is wound, there will be no local stress concentration on the transition portion and thus no damage to the transition portion due to fatigue.

In order to improve the durability of the clutch spring, the third invention provides a spring type one-way clutch comprising a tubular rotary shaft, a torque transmission member having a torque transmission shaft portion formed on one side surface of the torque transmission member and inserted in an end portion of the rotary shaft, and a clutch spring configured to transmit a rotation of the torque transmission member in a first direction and not transmit a rotation of the toque transmission member in a second direction, wherein the clutch spring comprises a large-diameter coil spring portion fitted in a radially inner surface of the rotary shaft with an interference fit, a transition portion extending radially inwardly from a winding end point of the large-diameter coil spring portion in a spiraling pattern in a direction in which the large-diameter coil spring portion is wound, and a small-diameter coil spring portion connected to a radially inner end of the transition portion and located in the large-diameter coil spring portion, wherein the small-diameter coil spring portion is wound in a direction different from the direction in which the large-diameter coil spring portion is wound, wherein the large-diameter coil spring portion is received in an annular spring receiving recess formed in an outer periphery of the torque transmission shaft portion and having axial end surfaces which restrict axial movement of the large-diameter coil spring portion, wherein the torque transmission shaft portion has, on the outer periphery of the torque transmission shaft portion, two radial bearing surfaces on respective axial sides of the spring receiving recess which rotatably support the rotary shaft, where the small-diameter coil spring portion is received in an annular space formed in the torque transmission shaft portion and open to an end surface of the torque transmission shaft portion such that a radially outer surface of the small-diameter coil spring portion is kept in elastic contact with an outer peripheral wall of the annular space, wherein the transition portion is received in a spiral groove formed in the torque transmission shaft portion, and wherein the clutch spring has an engaging piece at one end of the clutch spring which is in engagement with the torque transmission member.

With this spring type one-way clutch, when the torque transmission member is rotated in the direction in which the large-diameter coil spring portion is wound, the rotation of the torque transmission member is transmitted to the large-diameter coil spring portion through the engaging piece. The large-diameter coil spring portion is thus radially expanded and pressed against the radially inner surface of the rotary shaft. As a result, the rotation of the torque transmission member is transmitted to the rotary shaft, and the rotary shaft rotates in the same direction as the torque transmission member.

While torque is being transmitted, the rotation of the large-diameter coil spring portion is transmitted to the small-diameter coil spring portion through the transition portion, causing the small-diameter coil spring portion to be radially expanded and pressed against the outer peripheral wall of the annular space. The rotation of the torque transmission member is thus transmitted to the clutch spring because the small-diameter coil spring portion is pressed against the outer wall of the annular space, and is then transmitted to the rotary shaft through the large-diameter coil spring portion. Thus no large stress is applied to the engaging piece, which prevents damage to the engaging piece due to fatigue.

The transition portion extends radially inwardly from the winding end point of the large-diameter coil spring portion, which is rotating together with the rotary shaft, in a spiraling pattern in the direction in which the large-diameter coil spring portion is wound. Thus, there will be no local stress concentration on the transition portion, and thus no damage to the transition portion.

According to the third invention, since the large-diameter coil spring portion is received in the annular spring receiving recess formed in the torque transmission shaft portion of the torque transmission member, axial movement of the large-diameter coil spring portion is restricted by the axial end surfaces of the spring receiving recess. Thus, as soon as the torque transmission member begins to rotate in one direction, the large-diameter coil sprig portion is instantly radially expanded and pressed against the radially inner surface of the rotary shaft. Also, the large-diameter coil spring portion is pressed against the rotary shaft over the entire radially outer surface thereof. This improves response of the one-way clutch, as well as its torque capacity.

According to any of the first to third inventions, since the large-diameter coil spring portion is connected to the small-diameter coil spring portion, which is located in, and wound in a different direction from, the large-diameter coil spring portion, through the transition portion extending radially inwardly from the winding end point of the large-diameter coil spring portion in a spiraling pattern in the direction in which the large-diameter coil spring portion is wound, it is possible to reduce local stress concentration on the transition portion while rotation is being transmitted from the driving member to the driven member. This minimizes damage to the transition portion due to fatigue, thus improving durability of the clutch spring.

BRIEF DESCRIPTION OF THE DRAWINGS

FIG. 3(a) is a side view of a clutch spring shown in FIG. 1, and FIG. 3(b) is a sectional view taken along line III-III of FIG. 3(a).

DETAILED DESCRIPTION OF THE INVENTION

Figure 1:
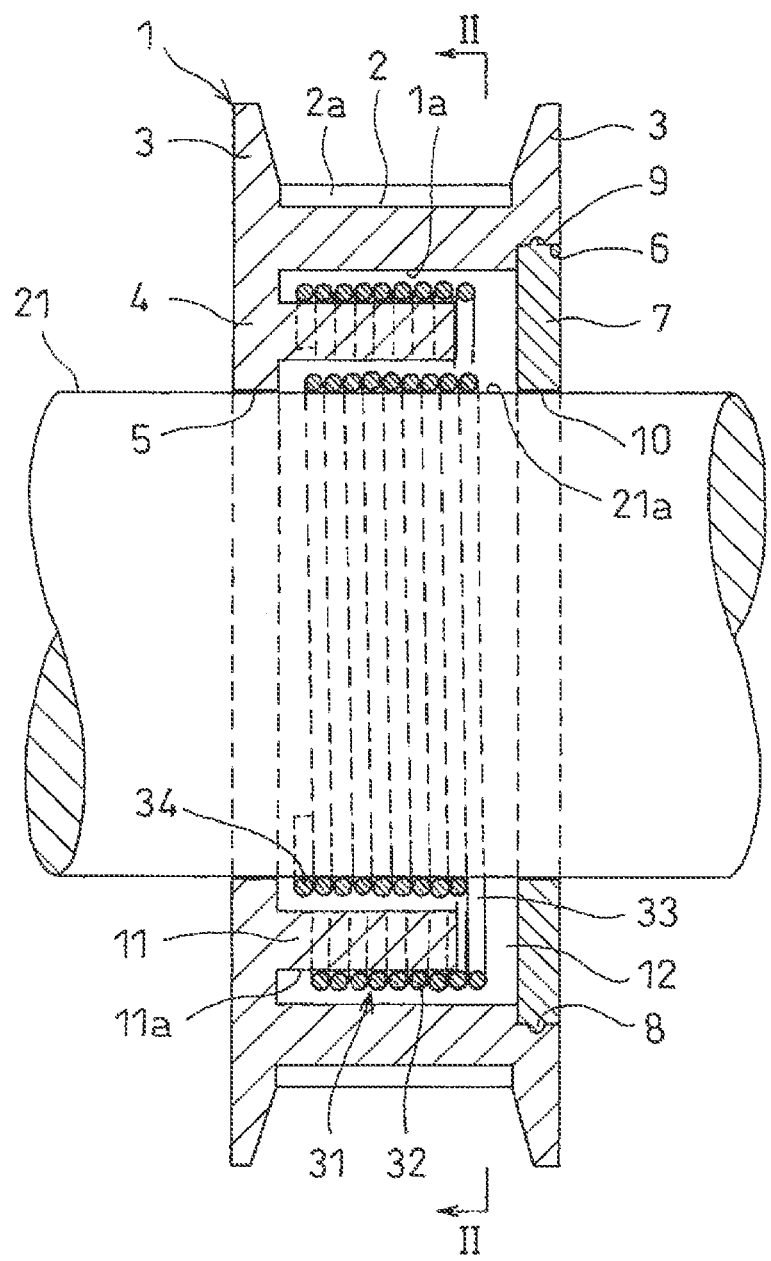
FIG. 1 is a vertical sectional view of a spring type one-way clutch according to a first embodiment of the present invention.
Figure 2:
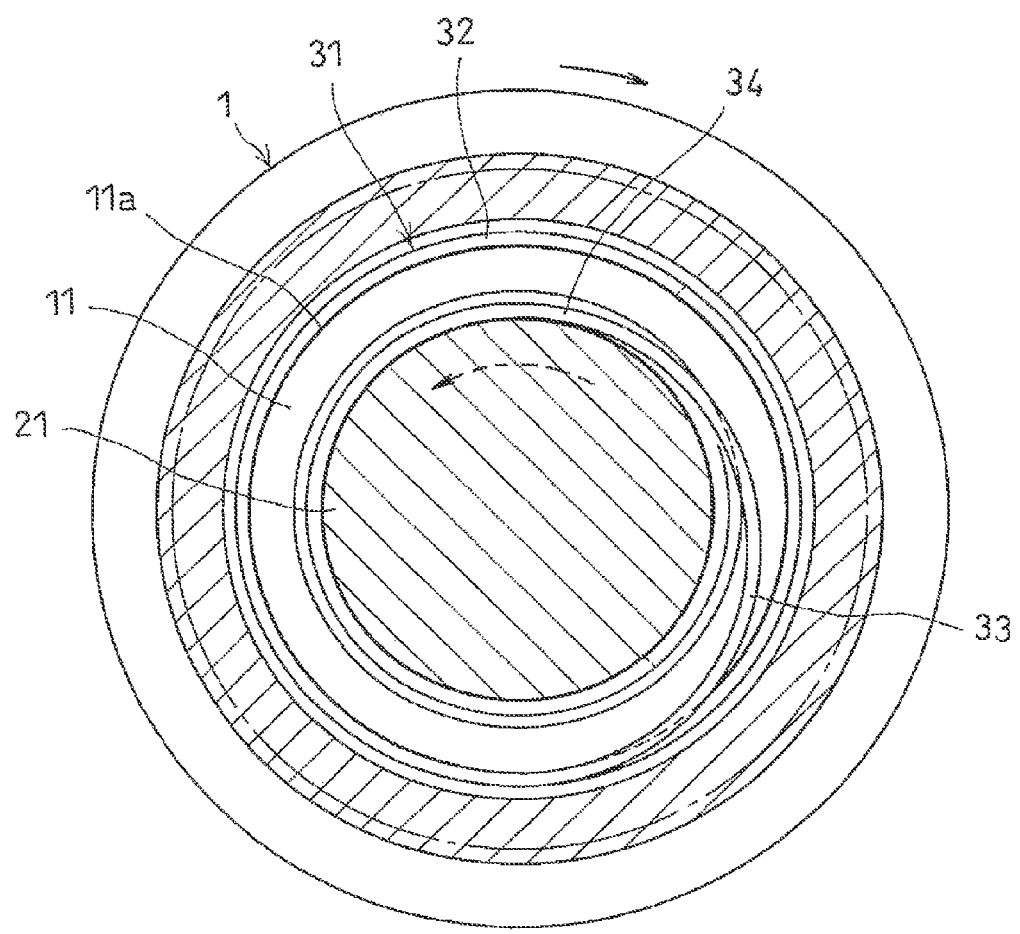
FIG. 2 is a sectional view taken along line II-II of FIG. 1.

Now referring to the drawings, the embodiments of the present invention are described. FIGS. 1 to 3 show the spring type one-way clutch of the first embodiment. As shown in FIGS. 1 and 2, this one-way clutch includes an outer ring 1 as an outer member, and a rotary shaft 21 as an inner member which is inserted in the central portion of the outer ring 1 such that the outer ring 1 and the rotary shaft 21 are rotatable relative to each other.

The outer ring 1 shown is a toothed pulley having a radially outer belt guide surface 2 formed with circumferentially equidistantly spaced apart, axially extending teeth 2a, and flanges 3 provided at the respective axial ends of the belt guide surface 2. But the outer ring 1 according to the present invention is not limited to a pulley but may be e.g. a gear.

The outer ring 1 includes, at one axial end thereof, an inwardly extending flange 4 having a radially inner radial bearing surface 5. The outer ring 1 is formed with a large-diameter recess 6 in the opening at the other end of the outer ring 1. A lid 7 is fitted in the large-diameter recess 6.

The lid 7 is an annular member formed with an annular protrusion 8 on its radially outer surface which is engaged in an engaging groove 9 formed in the radially inner surface of the large-diameter recess 6, thus preventing separation of the lid 7. The lid 7 has a radially inner radial bearing surface 10. The outer ring 1 and the rotary shaft 21 are supported so as to be rotatable relative to each other by this radial bearing surface 10 and the radial bearing surface 5 of the inwardly extending flange 4.

An inner tubular portion 11 is formed on the inner side surface of the inwardly extending flange 4. The axial length of the inner tubular portion 11 is determined such that a space 12 is defined between the distal end surface of the inner tubular portion 11 and the inner side surface of the lid 7.

A clutch spring 31 is mounted between the cylindrical radially inner surface 1a of the outer ring 1 and the cylindrical radially outer surface 21a of the rotary shaft 21 through which the rotation of one of the outer ring 1 and the rotary shaft 21 is selectively transmitted to the other.

As shown in FIGS. 3(a) and 3(b), the clutch spring 31 includes a large-diameter coil spring portion 32, an inwardly spiraling transition portion 33 integrally connected to the winding end point of the large-diameter coil spring portion 32, and a small-diameter coil spring portion 34 located inside of the large-diameter coil spring portion 32 and integrally connected to the small-diameter end of the transition portion 33. The large-diameter coil spring portion 32 is wound in the direction opposite to the direction in which the small-diameter coil spring portion 34 is wound.

In the embodiment, the large-diameter coil spring portion 32 is wound clockwise, while the small-diameter coil spring portion 34 is wound counterclockwise. The spiraling transition portion 33 is wound in the same direction as the large-diameter coil spring portion 32 is wound.

As shown in FIGS. 1 and 2, the clutch spring 31 is mounted such that the transition portion 33 is received in the space 12 defined between the distal end surface of the inner tubular portion 11 and the inner side surface of the lid 7. Further, the clutch spring 31 is mounted such that the large-diameter coil spring portion 32 is fitted on the radially outer surface of the inner tubular portion 11 with an interference fit, and the small-diameter coil spring portion 34 is fitted on the cylindrical radially outer surface 21a of the rotary shaft 21 with an interference fit.

In the embodiment, since the outer ring 1 is made of a synthetic resin and is thus lower in hardness than the rotary shaft 21, which is made of a metal, the clutch spring 31 is configured so as to satisfy the relation P1<P2, where P1 is the initial pressing force with which the small-diameter coil spring portion 34 is initially pressed against the radially outer surface of the rotary shaft 21, and P2 is the initial pressing force with which the large-diameter coil spring portion 32 is initially pressed against the radially outer surface 11a of the inner tubular portion 11.

In this spring type one-way clutch, one of the outer ring 1 and the rotary shaft 21 is used as a driving member to drive the other. If the outer member 1 is used as the driving member and rotated in the direction of the solid line arrow shown in FIG. 2, which is opposite the direction in which the large-diameter coil spring portion 32 is wound, the large-diameter coil spring portion 32 is radially compressed and thus pressed hard against the inner tubular portion 11, allowing the large-diameter coil spring portion 32 to rotate together with the outer ring 1. The rotation of the large-diameter coil spring portion 32 is transmitted to the small-diameter coil spring portion 34 through the transition portion 33.

At this time, since the large-diameter coil spring portion 32 and the small-diameter coil spring portion 34 are wound in opposite directions to each other, the small-diameter coil spring portion 34 is radially compressed and pressed hard against the radially outer surface of the rotary shaft 21. Thus, the rotation of the outer ring 1 is transmitted to the rotary shaft 21 through the clutch spring 31, allowing the rotary shaft 21 to rotate in the same direction as the outer ring 1.

While torque is being transmitted from the outer ring 1 to the rotary shaft 21, stress corresponding to the torque being transmitted is applied to the transition portion 33 of the clutch spring 31. But since the transition portion 33 is wound in the same direction as the large-diameter coil spring portion 32 is wound, and extends spirally inwardly from the winding end point of the large-diameter coil spring portion 32, stress never concentrates on a limited narrow area of the transition portion 33, which in turn reduces the possibility of breakage of the transition portion 33 due to fatigue.

When the outer ring 1 is rotated in the direction opposite to the direction of the solid line arrow of FIG. 2 (i.e. in the same direction as the large-diameter coil spring portion 32 is wound), the large-diameter coil spring portion 32 rotates together with the outer ring 1. The rotation of the large-diameter coil spring portion 32 is transmitted to the small-diameter coil spring portion 34 through the transition portion 33.

At this time, since the pressing force P1 with which the small-diameter coil spring portion 34 is pressed against the cylindrical radially outer surface 21a of the rotary shaft 21 is smaller than the pressing force P2 with which the large-diameter coil spring portion 32 is pressed against the inner tubular portion 11, the small-diameter coil spring portion 34 is radially expanded. Thus, the rotation of the outer ring 1 is not transmitted to the rotary shaft 21, so that only the outer ring 1 rotates. At this time, slip occurs only between the contact portions of the clutch spring 31 and the hard rotary shaft 21, and no slip occurs between the clutch spring 31 and the inner tubular portion 11 of the outer ring 1. This prevents wear of the less hard tubular portion 11.

If the rotary shaft 21 is used as the driving member for driving the outer ring 1, and if the rotary shaft 21 is rotated in the direction of the broken line arrow of FIG. 2 (i.e. in the same direction as the small-diameter coil spring portion 34 is wound), the small-diameter coil spring portion 34 is radially compressed, thereby pressing hard against the radially outer surface of the rotary shaft 21. Simultaneously, the large-diameter coil spring portion 32 is also radially compressed, and pressed hard against the radially outer surface 11a of the inner tubular portion 11. Thus, the rotation of the rotary shaft 21 is transmitted to the outer ring 1.

When the rotary shaft 21 is rotated in the direction opposite to the direction of the broken line arrow of FIG. 2, the small-diameter coil spring portion 34 is radially expanded, causing the rotary shaft 21 to slip relative to the small-diameter coil spring portion 34. The rotation of the rotary shaft 21 is thus not transmitted to the outer ring 1, so that only the rotary shaft 21 rotates.

Figure 4:
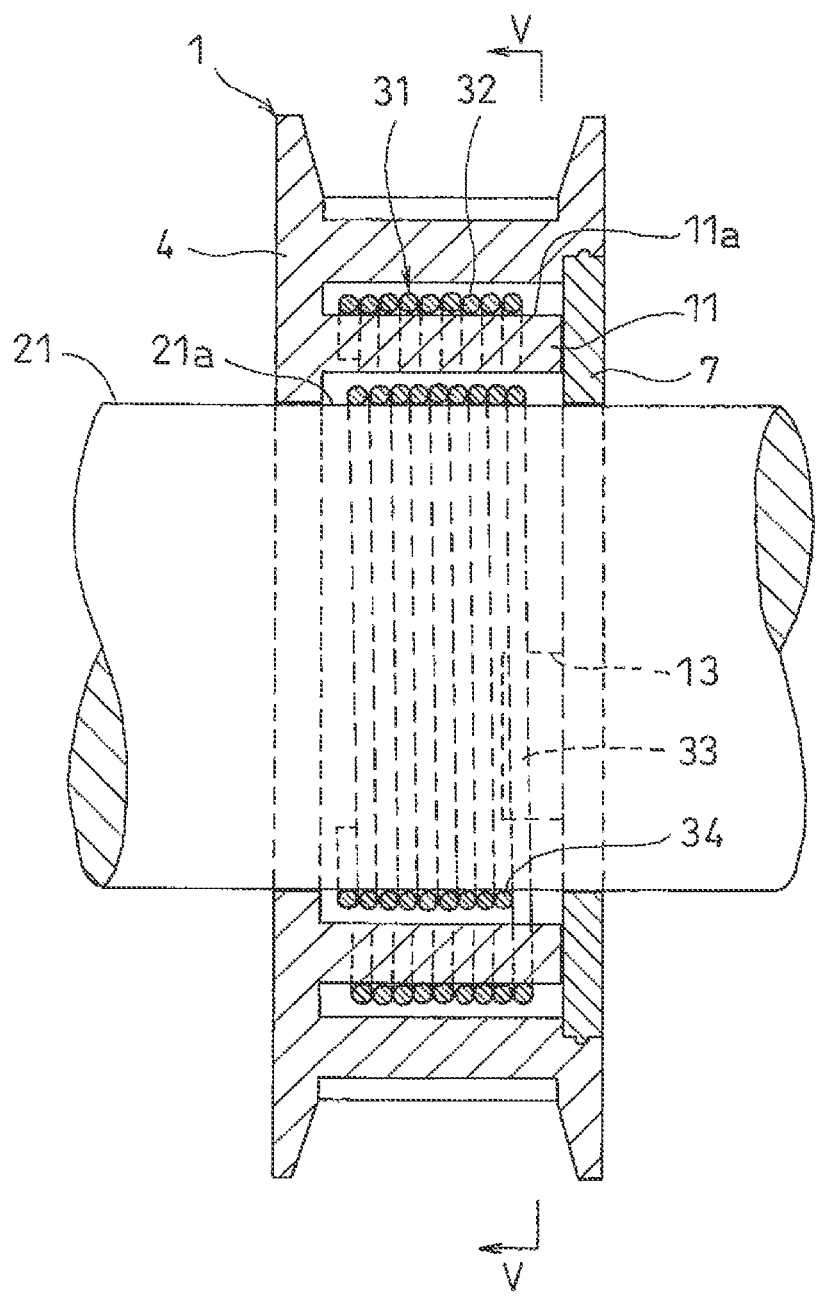
FIG. 4 is a vertical sectional view of a spring type one-way clutch according to a second embodiment of the present invention.
Figure 5:
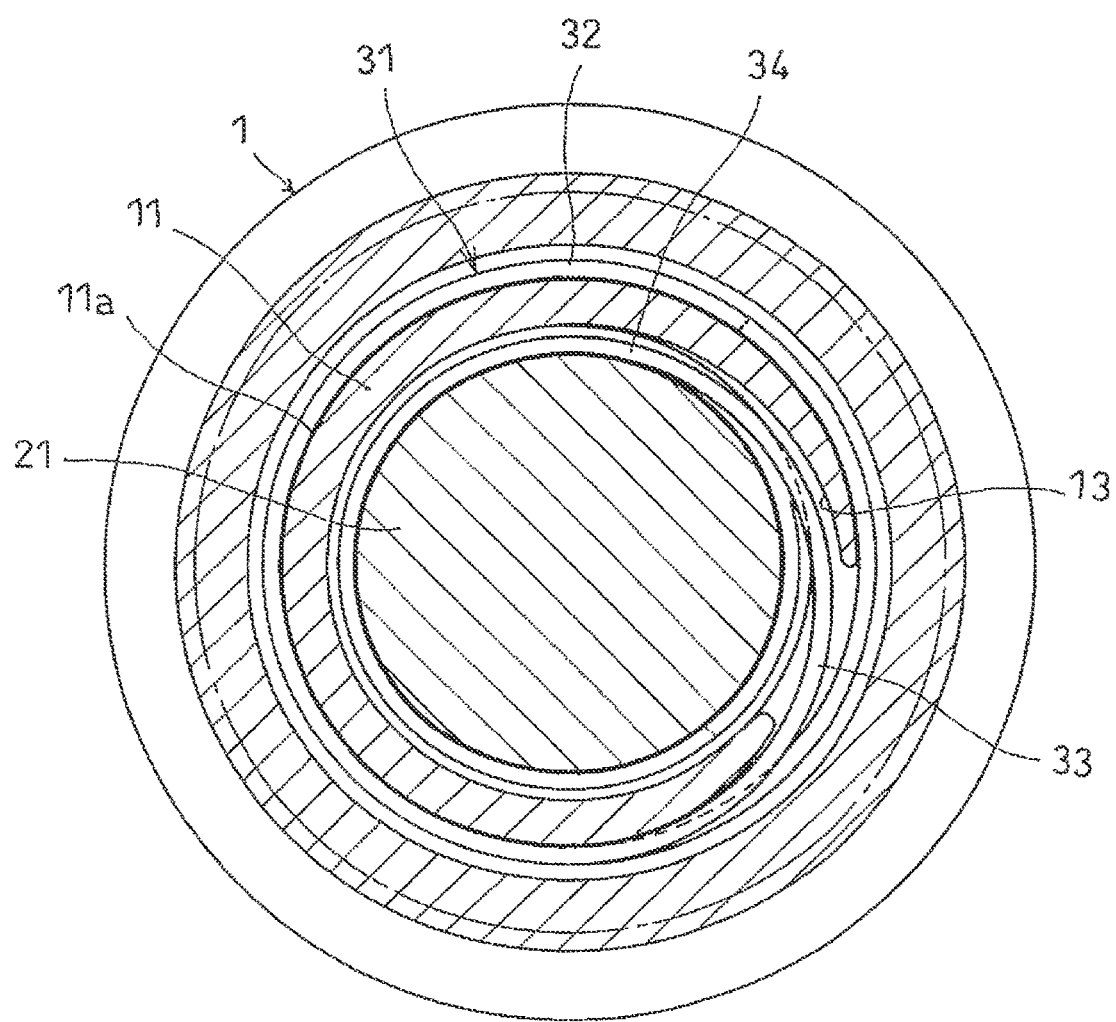
FIG. 5 is a sectional view taken along line V-V of FIG. 4.

FIGS. 4 and 5 show the spring type one-way clutch according to the second embodiment of the present invention. This embodiment differs from the first embodiment in that the inner tubular portion 11 extending from the inner side surface of the inwardly extending flange 4 has an axial length determined such that its distal end surface abuts the inner side surface of the lid 7 or faces the inner side surface of the lid 7 with a minute axial gap left therebetween, and that a spiral groove 13 is formed in the distal end surface of the tubular portion 11 in which the transition portion 33 of the clutch spring 31 is received. Otherwise, this embodiment is structurally identical to the first embodiment. Thus, like elements are denoted by identical numerals and their description is omitted.

As in the second embodiment, by forming the spiral groove 13 in the distal end surface of the inner tubular portion 11 in which the transition portion 33 of the clutch spring 31 is received, stress applied to the transition portion 33 while torque is being transmitted between the outer ring 1 and the rotary shaft 21 is received by the inner wall of the spiral groove 13. This effectively prevents damage to the transition portion 33.

Figure 6:
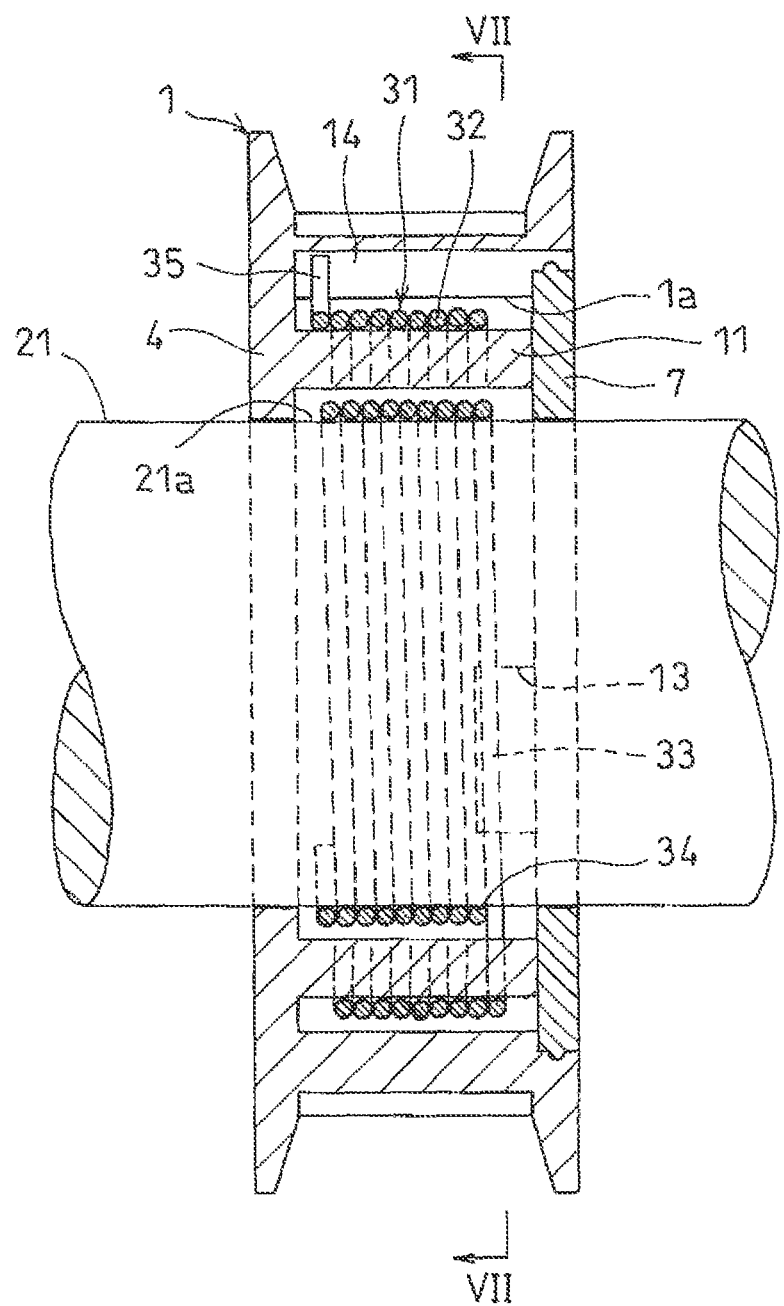
FIG. 6 is a vertical sectional view of a spring type one-way clutch according to a third embodiment of the present invention.
Figure 7:
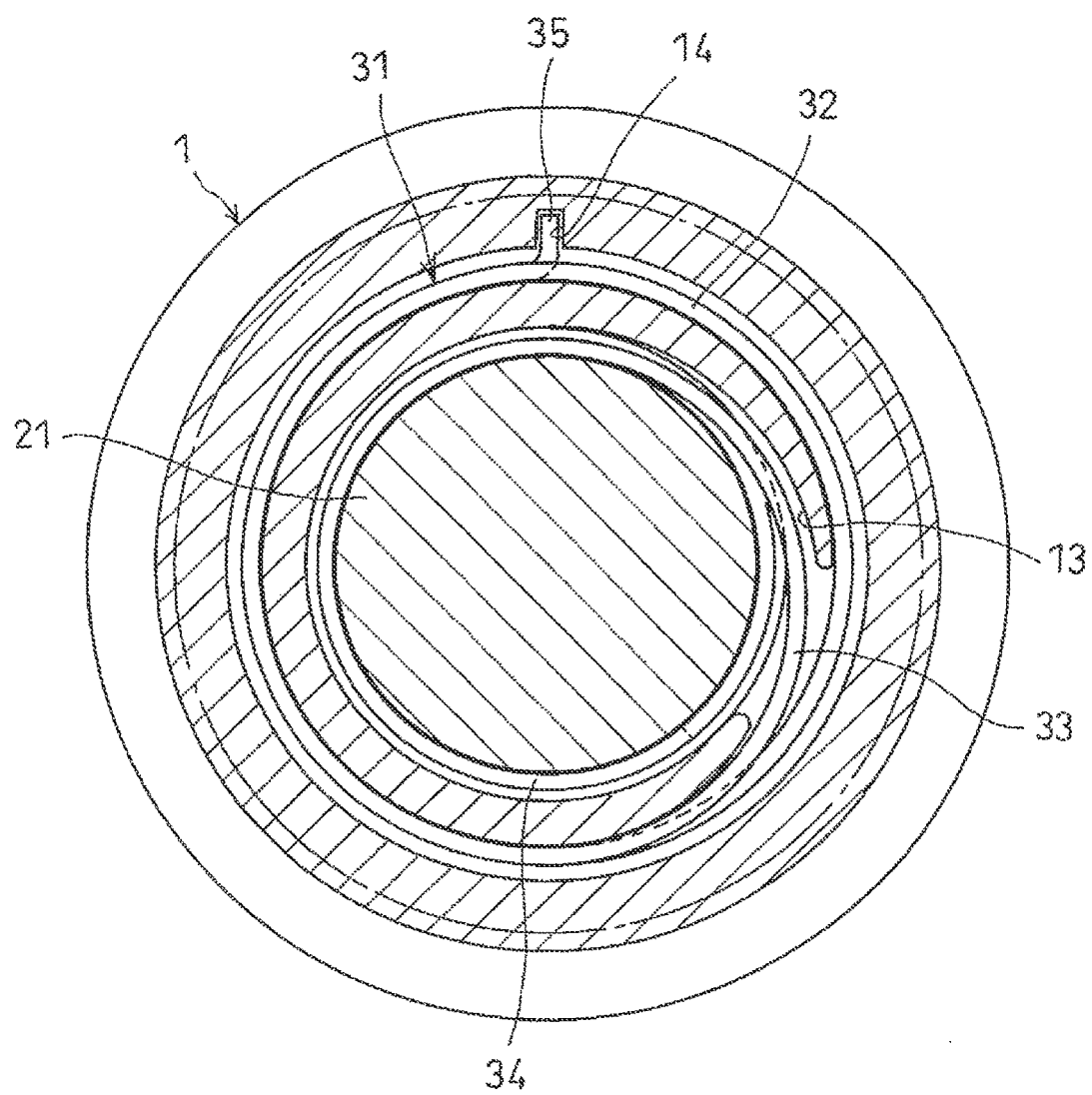
FIG. 7 is a sectional view taken along line VII-VII of FIG. 6.

FIGS. 6 and 7 show the spring type one-way clutch according to the third embodiment of the present invention. This embodiment differs from the spring type one-way clutch of the second embodiment in that a radially outwardly extending hook 35 is provided at the winding start point of the large-diameter coil spring portion 32 which is engaged in an axially extending engaging groove 14 formed in the cylindrical radially inner surface 1a of the outer ring 1. Otherwise, this embodiment is structurally identical to the second embodiment. Thus, like elements are denoted by identical numerals and their description is omitted.

As shown in the third embodiment, by providing the hook 35 at the winding start point of the large-diameter coil spring portion 32 which is engaged in the axially extending engaging groove 14 formed in the outer ring 1, it is possible to reliably transmit the rotation of the outer ring 1 to the large-diameter coil spring portion 32 if the outer ring 1 is used as the driving member. While the rotation of the outer ring 1 is not supposed to be transmitted to the rotary shaft 21, slip reliably occurs between, and only between, the contact portions of the small-diameter coil spring portion 34 and the cylindrical radially outer surface 21a of the rotary shaft 21.

Figure 8:
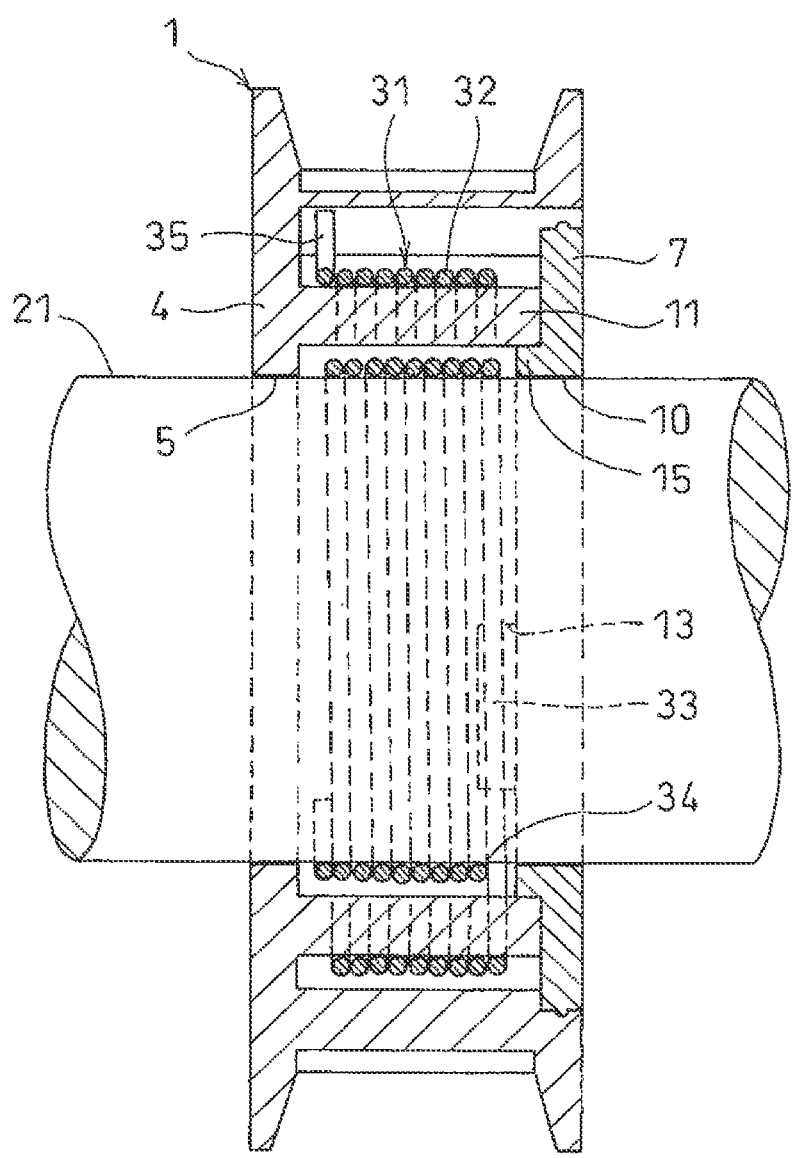
FIG. 8 is a vertical sectional view of a spring type one-way clutch according to a fourth embodiment of the present invention.

FIG. 8 shows the spring type one-way clutch according to the fourth embodiment of the present invention. In this embodiment, the lid 7 has an annular protrusion 15 formed on its inner side surface and fitted in the distal end portion of the inner tubular portion 11. Otherwise, this embodiment is structurally identical to the third embodiment. Thus, like elements are denoted by identical numerals and their description is omitted.

As shown in the fourth embodiment, by providing the lid 7 with the annular protrusion 15 formed on its inner side surface and fitted in the distal end portion of the inner tubular portion 11, the annular protrusion 15 supports the free end of the inner tubular portion 11, thus increasing the resistance to bending of the inner tubular portion 11. This in turn prevents deformation of and damage to the inner tubular portion 11, so that the large-diameter coil spring portion 32 can be reliably pressed against the inner tubular portion 11 when the coil spring portion 32 is radially compressed, thereby preventing slippage between the contact portions of the inner tubular portion 11 and the large-diameter coil spring portion 32. Torque can thus be reliably transmitted therebetween.

Figure 9:
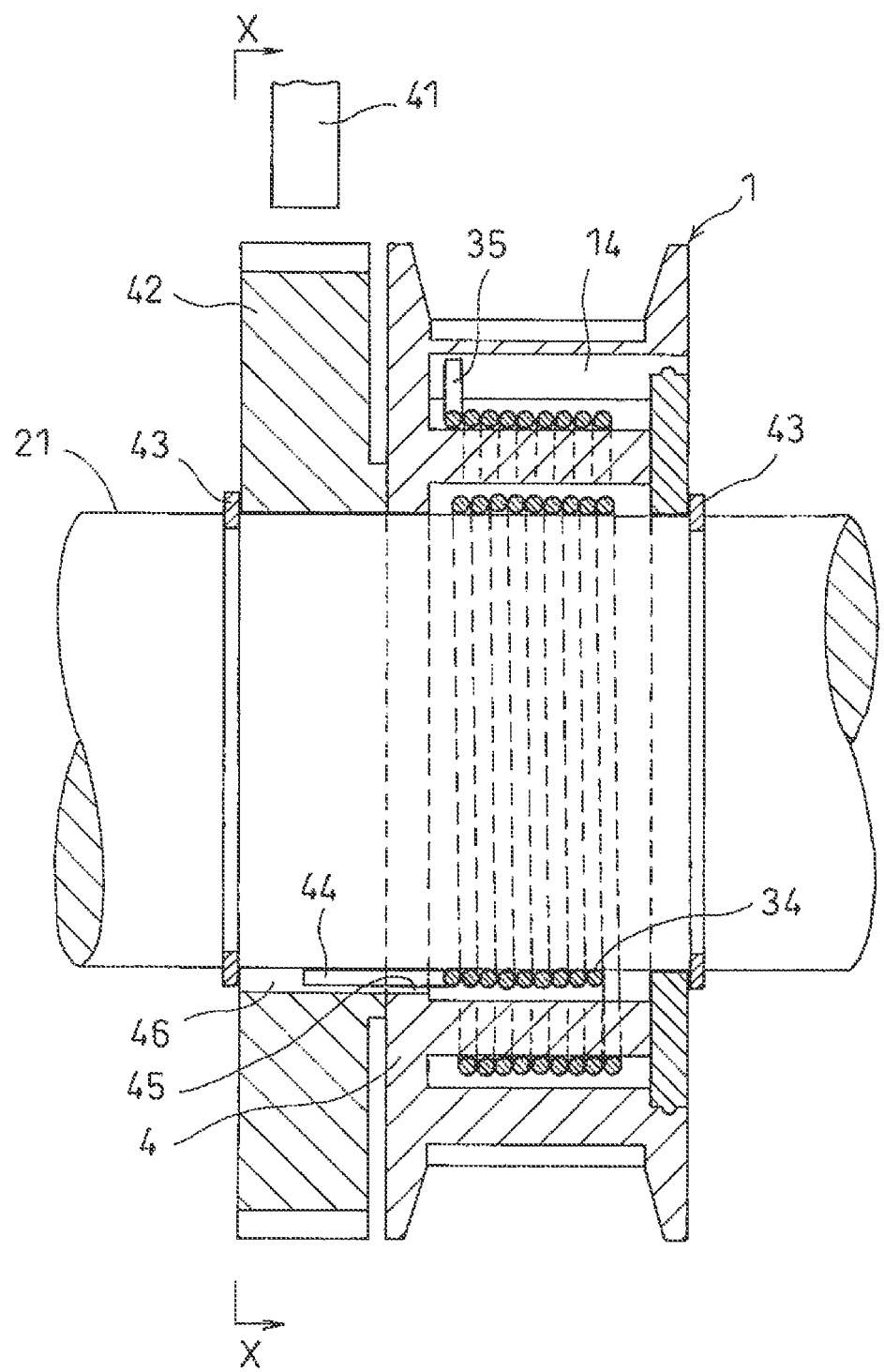
FIG. 9 is a vertical sectional view of a spring type one-way clutch according to a fifth embodiment of the present invention.
Figure 10:
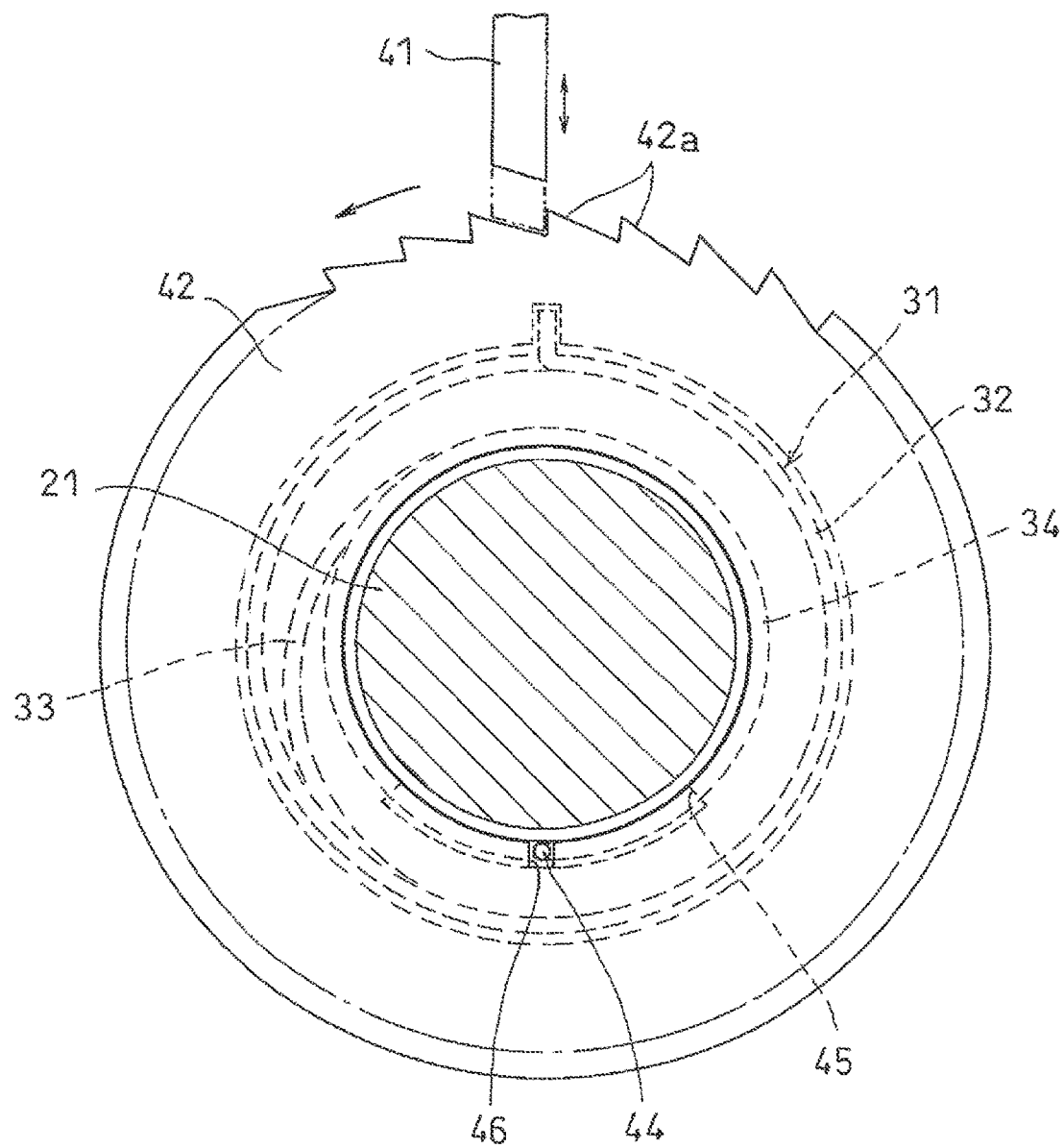
FIG. 10 is a sectional view taken along line X-X of FIG. 9.

FIGS. 9 and 10 show the spring type one-way clutch according to the fifth embodiment of the present invention. In this embodiment, the outer ring 1 is used as the driving member for driving the rotary shaft 21. This embodiment includes a ratchet wheel 42 rotatably provided around the rotary shaft 21, and a ratchet pawl 41 which controls the rotation of the ratchet wheel 42 by selectively engaging the ratchet wheel 42. A pair of snap rings 43 are fitted on the radially outer surface of the rotary shaft 21 to prevent axial movement of the ratchet wheel 42 and the outer ring 1.

The small-diameter coil spring portion 34 of the clutch spring 31 has an engaging piece 44 at the winding end point thereof which extends through a fan-shaped cutout 45 formed in the radially inner surface of the inwardly extending flange 4 and is engaged in an axial groove 46 formed in the radially inner surface of the ratchet wheel 42. Otherwise, this embodiment is structurally identical to the third embodiment. Thus, like elements are denoted by identical numerals and their description is omitted.

In the one-way clutch of the fifth embodiment, when the outer ring 1 is rotated in the direction of the arrow in FIG. 10 (which is opposite to the winding direction of the large-diameter coil spring portion 32) with the ratchet pawl 41 in engagement with none of the teeth 42a on the outer periphery of the ratchet wheel 42, the large-diameter coil spring portion 32 is radially compressed, thus pressing against the inner tubular portion 11, while the small-diameter coil spring portion 34 is also radially compressed, thus pressing against the cylindrical radially outer surface 21a of the rotary shaft 21. The rotation of the outer ring 1 is thus transmitted to the rotary shaft 21.

The rotation of the clutch spring 31, which is rotating together with the outer ring 1, is transmitted to the ratchet wheel 42 through the engaging piece 44 formed at the winding end point of the small-diameter coil spring portion 34 and engaged in the axial groove 46. Thus, the ratchet wheel 42 is rotated in the same direction as the outer ring 1.

With torque being transmitted from the outer ring 1 to the rotary shaft 21, when the ratchet pawl 41 is moved radially inwardly of the ratchet wheel 42 until the ratchet pawl 41 engages one of the teeth 42a on the outer periphery of the ratchet wheel 42, thereby stopping the ratchet wheel 42, the small-diameter coil spring portion 34 is radially expanded. The rotation of the outer ring 1 is thus not transmitted to the rotary shaft 21 any longer.

Thus, in the fifth embodiment, it is possible to selectively transmit the rotation of the outer ring 1 to the rotary shaft 21 by controlling the rotation of the ratchet wheel 42.

Figure 11:
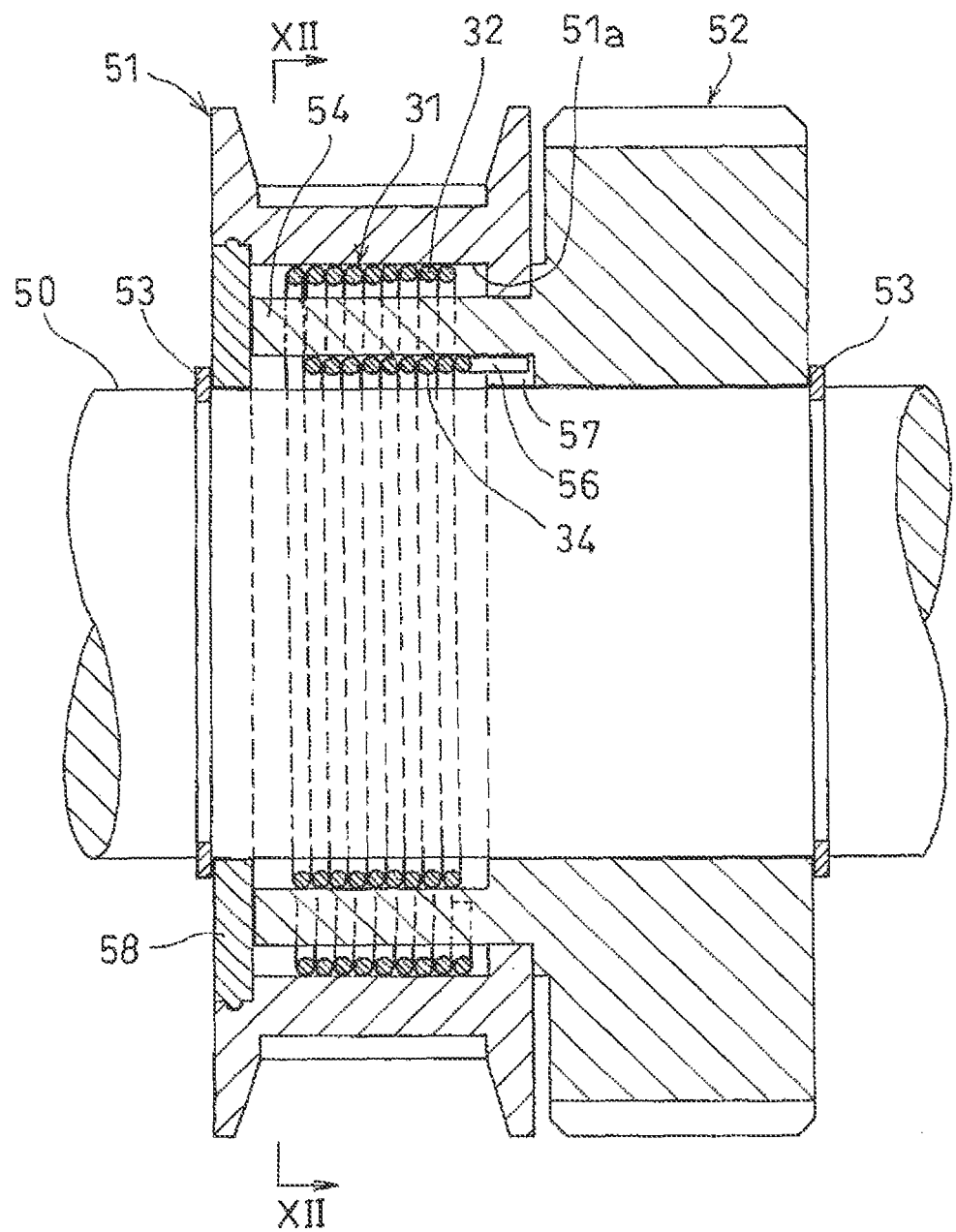
FIG. 11 is a vertical sectional view of a spring type one-way clutch according to a sixth embodiment of the present invention.
Figure 12:
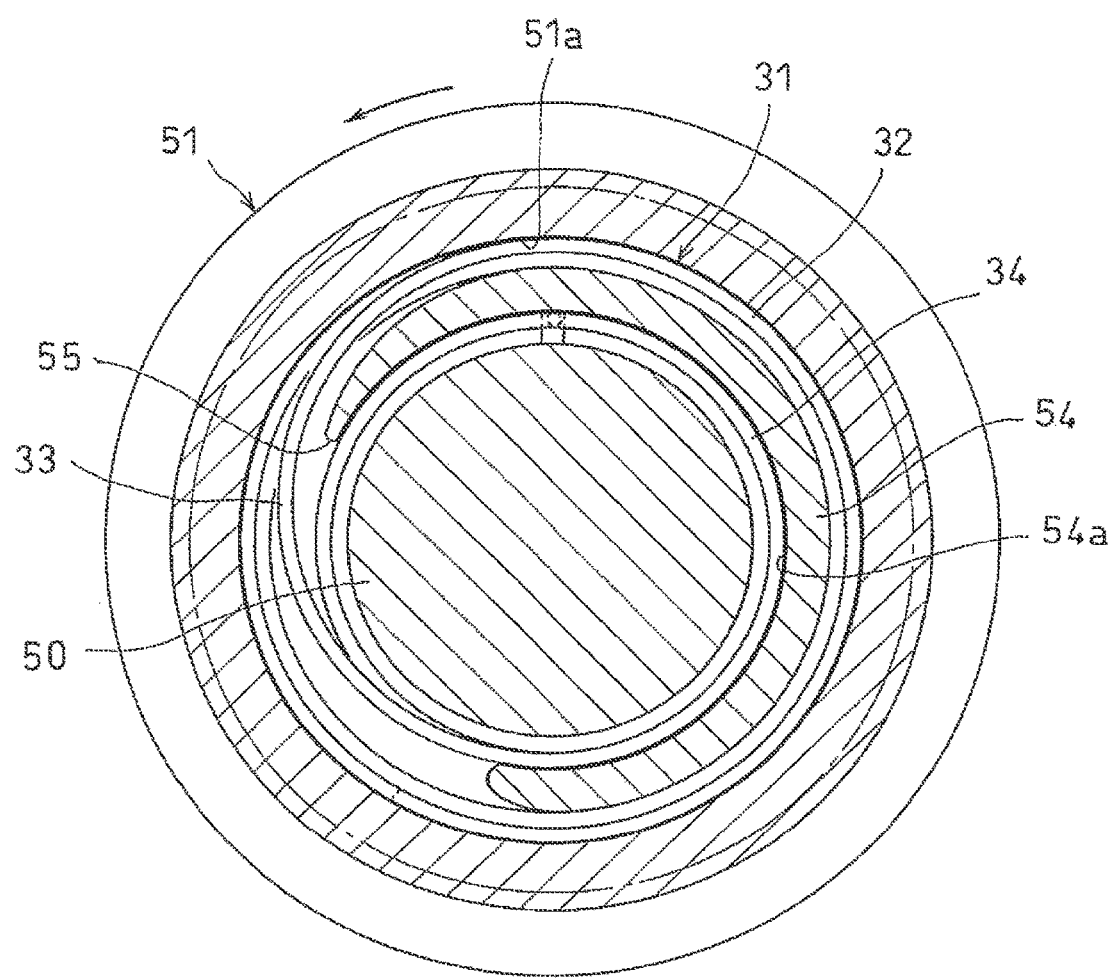
FIG. 12 is a sectional view taken along line XII-XII of FIG. 11.

FIGS. 11 and 12 show the spring type one-way clutch according to the sixth embodiment of the present invention. The clutch of this embodiment includes a stationary shaft 50, a driving ring 51, as a driving member, rotatably mounted on the stationary shaft 50, and a driven ring 52, as a driven member, rotatably mounted on the stationary shaft 50 in juxtaposition with the driving ring 51. A pair of snap rings 53 are fitted on the radially outer surface of the stationary shaft 50 to prevent axial movement of the driving ring 51 and the driven ring 52. The driven ring 52 has a cylindrical portion 54 formed on one side of the driven ring 52 facing the driving ring 51 and inserted in the driving ring 51.

The clutch spring 31 shown in FIG. 3 is mounted in the driving ring 51 such that the large-diameter coil spring portion 32 of the clutch spring 31 is radially compressed while being elastically kept in contact with the cylindrical radially inner surface 51a of the driving ring 51, such that the transition portion 33 connected to the winding end point of the large-diameter coil spring portion 32 is received in a spiral groove 55 formed in the distal end surface of the cylindrical portion 54, and such that the small-diameter coil spring portion 34 is inserted in the cylindrical portion 54 in a radially compressed state while being elastically kept in contact with the radially inner surface 54a of the cylindrical portion 54.

In the sixth embodiment, the small-diameter coil spring portion 34 has an engaging piece 56 at its winding end point which is engaged in an engaging hole 57 formed in the closed end surface of the cylindrical portion 54.

In the one-way clutch of the sixth embodiment, when the driving ring 51 is rotated in the direction in which the large-diameter coil spring portion 32 is wound (i.e. the direction of the arrow in FIG. 12), the large-diameter coil spring portion 32 is radially expanded, thus pressing against the cylindrical radially inner surface 51a of the driving ring 51. The large-diameter coil spring portion 32 thus rotates in the same direction as the driving ring 51. The rotation of the large-diameter coil spring portion 32 is transmitted to the small-diameter coil spring portion 34 through the transition portion 33. The small-diameter coil spring portion 34 is thus radially expanded, and pressed against the radially inner surface 54a of the cylindrical portion 54. As a result, the rotation of the driving ring 51 is transmitted to the driven ring 52 through the clutch spring 31, and the driven ring 52 is rotated in the direction as the driving ring 51.

In the sixth embodiment, while torque is being transmitted from the driving ring 51 to the driven ring 52, stress corresponding to the torque being transmitted is applied to the transition portion 33 of the clutch spring 31. But since the transition portion 33 extends in a spiral pattern radially inwardly in the same direction in which the large-diameter coil spring portion 32 is rotated (and wound), stress never concentrates on a limited narrow area of the transition portion 33, which in turn reduces the possibility of breakage of the transition portion 33 due to fatigue.

In the sixth embodiment too, the annular protrusion 15 shown in FIG. 8 is preferably provided on the inner side surface of a lid 58 closing the opening of the driving ring 51 at one end thereof so as to be inserted in the distal end portion of the cylindrical portion 54, thereby supporting the free end portion of the cylindrical portion 54.

Figure 13:
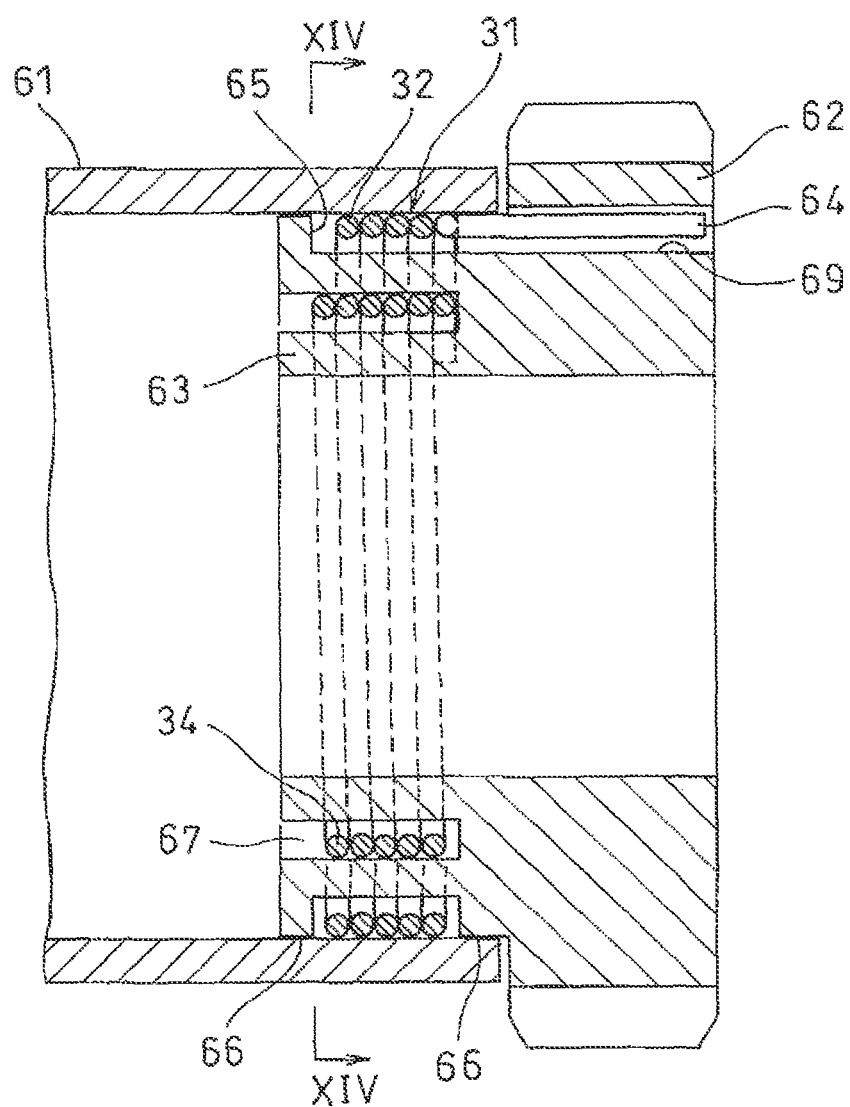
FIG. 13 is a vertical sectional view of a spring type one-way clutch according to a seventh embodiment of the present invention.
Figure 14:
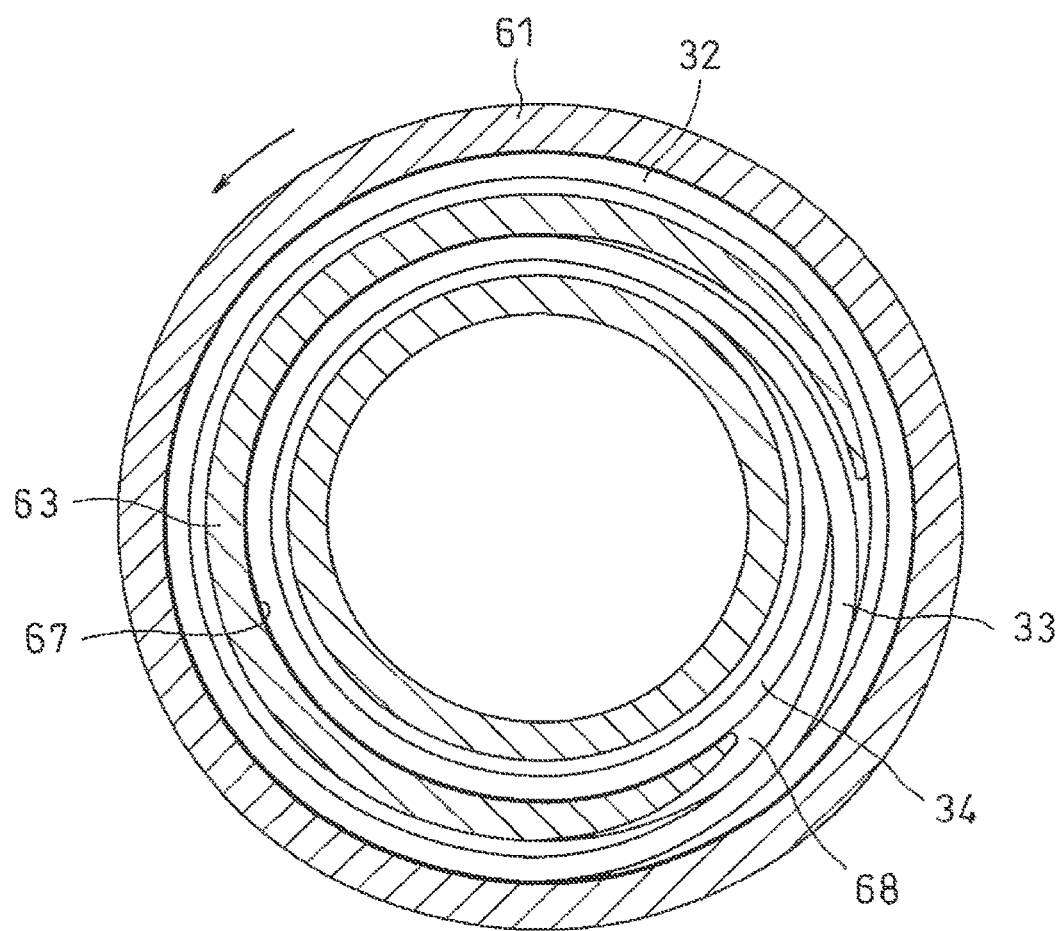
FIG. 14 is a sectional view taken along line XIV-XIV of FIG. 13.

FIGS. 13 and 14 show the spring type one-way clutch according to the seventh embodiment of the present invention. The clutch of this embodiment includes a tubular rotary shaft 61, a gear 62, as a torque transmission member, having a torque transmission shaft portion 63 provided on one side of the gear 62 and inserted in one end portion of the rotary shaft 61, and a clutch spring 31 mounted on the torque transmission shaft portion 63 such that the rotation of the gear 62 in one direction can be transmitted to the rotary shaft 61 through the clutch spring 31.

The clutch spring 31 of this embodiment is similar to the clutch spring 31 shown in FIG. 3 in that it includes a right-hand large-diameter coil spring portion 32, a transition portion 33 extending radially inwardly from the winding end point of the large-diameter coil spring portion 32 in a right-hand spiral pattern, and a left-hand small-diameter coil spring portion 34 located inside of the large-diameter coil spring portion 32. The large-diameter coil spring portion 32 has at its winding start point an axially extending engaging piece 64. The clutch spring 31 is mounted such that the large-diameter coil spring portion 32 is fitted on the radially inner surface of the rotary shaft 61 with an interference fit.

The torque transmission shaft portion 63 provided on the side surface of the gear 62 has an annular spring receiving recess 65 formed in the outer periphery thereof in which the large-diameter coil spring portion 32 is mounted with its axial movement prevented by axial end surfaces of the recess 65, and two radial bearing surfaces 66 formed on the respective axial sides of the spring receiving recess 65 and rotatably supporting the rotary shaft 61. The torque transmission shaft portion 63 further defines an annular space 67 which opens to the end surface of the torque transmission shaft portion 63 and in which the small-diameter coil spring portion 34 is mounted such that radially outer surface of the small-diameter coil spring portion 34 is brought into elastic contact with the radially outer wall of the annular space 67. The torque transmission shaft portion 63 is further formed with a spiral groove 68 in which the transition portion 33 of the clutch spring 31 is received. The engaging piece 64 at the winding start point of the large-diameter coil spring portion 32 of the clutch spring 31 is engaged in an axial engaging hole 69 formed in the gear 62.

In this spring type one-way clutch, when the gear 62 is rotated in the direction of the arrow in FIG. 14 (i.e. the winding direction of the large-diameter coil spring portion 32), the rotation of the gear 62 is transmitted to the large-diameter coil spring portion 32 through the engaging piece 64. This causes the large-diameter coil spring portion 32 to be radially expanded and pressed against the radially inner surface of the rotary shaft 61. As a result, the rotation of the gear 62 is transmitted to the rotary shaft 61, and the rotary shaft 61 is rotated in the same direction as the torque transmission member.

While torque is being transmitted in the above manner, the rotation of the large-diameter coil spring portion 32 is transmitted to the small-diameter coil spring portion 34 through the transition portion 33. At this time, since the small-diameter coil spring portion 34 is wound in the direction opposite to the direction in which the large-diameter coil spring portion 32 is wound, the small-diameter coil spring portion 34 is radially expanded and pressed against the outer peripheral wall of the annular space 67.

Thus, the rotation of the gear 62 is transmitted to the clutch spring 31 through the surface of the small-diameter coil spring portion 34 pressed against the wall of the space 67, and then to the rotary shaft 61 through the large-diameter coil spring portion 32. During this while, no large stress acts on the engaging piece 64, it is possible to prevent damage to the engaging piece 64 due to fatigue.

The transition portion 33 extends radially inwardly from the winding end point of the large-diameter coil spring portion 32 in a spiraling pattern in the direction in which the large-diameter coil spring portion 32 is wound. Thus there will be no local stress concentration on the transition portion 33, which prevents damage to the transition portion 33 due to fatigue.

If the torque transmission shaft portion 63 is not formed with the spring receiving recess 65 and thus its radially outer surface is a cylindrical surface of which the diameter is constant over the entire axial length, when the large-diameter coil spring portion 32 is radially expanded and pressed against the radially inner surface of the rotary shaft 61, the large-diameter coil spring portion 32 would be simultaneously stretched in the axial direction. This could cause the rotary shaft 61 to shift axially until the winding start point of the large-diameter coil spring portion 32 separates from the radially inner surface of the rotary shaft 61. If this happens, since the entire radially outer surface of the large-diameter coil spring portion 32 cannot be pressed against the radially inner surface of the rotary shaft 61, it may become impossible to transmit the rotation of the gear 62 to the rotary shaft 61.

In the seventh embodiment, since the large-diameter coil spring portion 32 is received in the annular spring receiving recess 65 formed in the torque transmission shaft portion 63 of the gear 62, axial movement of the large-diameter coil spring portion 32 is prevented by the axial end surfaces of the spring receiving recess 65.

Thus, when the gear 62 rotates in the above-mentioned one direction, the large-diameter coil spring portion 32 is instantly radially expanded until pressed against the radially inner surface of the rotary shaft 61, and further its entire radially outer surface is pressed against the rotary shaft 61. This improves the torque capacity and response of the one-way clutch.

Figure 15:
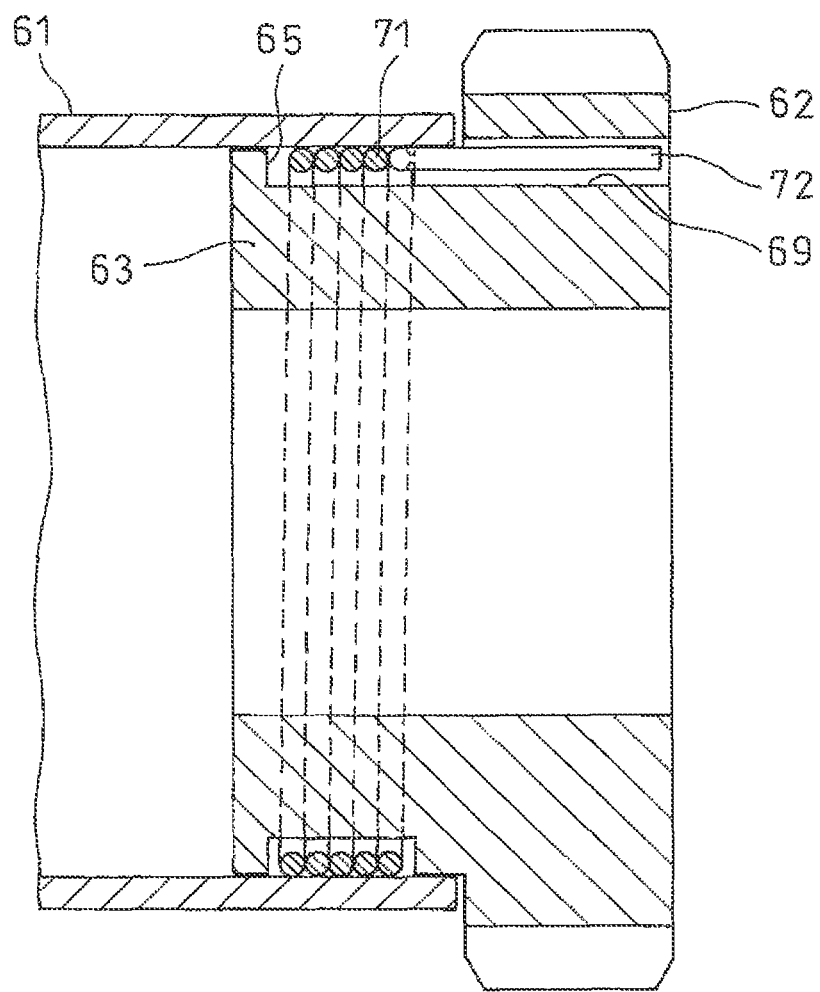
FIG. 15 is a vertical sectional view of a spring type one-way clutch of a reference example.

The spring receiving recess 65 formed in the torque transmission shaft portion 63 prevents axial movement of the large-diameter coil spring portion 32, thereby improving response of the one-way clutch. Thus, if the recess 65 is formed, it is possible to improve response of the one-way clutch by, as shown in FIG. 15, mounting a single-layered clutch spring 71 such that an engaging piece 72 formed at one end of the clutch spring 71 is engaged in an engaging hole 69 formed in the gear 62, too.

In the seventh embodiment, the torque transmission member is the gear 62 but is not limited to a gear. The torque transmission member may be e.g. a pulley. Also, the torque transmission member may be made of a synthetic resin or a metal.

In the seventh embodiment, the engaging piece 72 is formed at the winding start point of the large-diameter coil spring portion 32. But the engaging piece may be formed at the winding end point of the small-diameter coil spring portion 34 so as to be brought into engagement with the gear.

What is claimed is:

1. A spring type one-way clutch comprising:
   a tubular outer member including an inwardly extending flange at a first end of the outer member and having an opening at a second end of the outer member;
   an inner member inserted in the outer member so as to be coaxial with the outer member;
   a clutch spring mounted between a radially inner surface of the outer member and a radially outer surface of the inner member; and
   a lid closing the opening of the outer member;
   wherein the inwardly extending flange of the outer member has an inner tubular portion on an inner side surface of the flange;
   wherein the clutch spring comprises a large-diameter coil spring portion fitted on a radially outer surface of the inner tubular portion with an interference fit, a transition portion having a starting point connected to an end of the large-diameter coil spring portion, and extending radially inwardly from the starting point to an end point of the transition portion in a spiraling pattern in a direction in which the large-diameter coil spring portion is wound such that none of the portion of the transition portion other than the starting point is radially aligned with the starting point, and a small-diameter coil spring portion extending from the end point of the transition portion so as to be located in the large-diameter coil spring portion, wherein the small-diameter coil spring portion is wound in a direction different from the direction in which the large-diameter coil spring portion is wound, and wherein the small-diameter coil spring portion is fitted on a cylindrical radially outer surface of the inner member with an interference fit; and
   wherein the inner tubular portion has an axial length determined such that a distal end surface of the inner tubular portion abuts the inner side surface of the lid, or the distal end surface of the inner tubular portion axially faces the inner side surface of the lid with a minute gap left therebetween, and wherein a spiral groove is formed in the distal end surface of the inner tubular portion in which the transition portion of the clutch spring is received.

2. A spring type one-way clutch comprising,
   a tubular outer member including an inwardly extending flange at a first end of the outer member and having an opening at a second end of the outer member;
   an inner member inserted in the outer member so as to be coaxial with the outer member;
   a clutch spring mounted between a radially inner surface of the outer member and a radially outer surface of the inner member; and
   a lid closing the opening of the outer member;
   wherein the inwardly extending flange of the outer member has an inner tubular portion on an inner side surface of the flange;
   wherein the clutch spring comprises a large-diameter coil spring portion fitted on a radially outer surface of the inner tubular portion with an interference fit, a transition portion extending radially inwardly from a winding end point of the large-diameter coil spring portion in a spiraling pattern in a direction in which the large-diameter coil spring portion is wound, and a small-diameter coil spring portion extending from a radially inner end of the transition portion so as to be located in the large-diameter coil spring portion, wherein the small-diameter coil spring portion is wound in a direction different from the direction in which the large-diameter coil spring portion is wound, and wherein the small-diameter coil spring portion is fitted on a cylindrical radially outer surface of the inner member with an interference fit; and wherein the inner tubular portion has an axial length determined such that a distal end surface of the inner tubular portion abuts the inner side surface of the lid, or the distal end surface of the inner tubular portion axially faces the inner side surface of the lid with a minute gap left therebetween, and wherein a spiral groove is formed in the distal end surface of the inner tubular portion in which the transition portion of the clutch spring is received; and wherein the lid has an annular protrusion formed on the inner side surface of the lid and fitted in a distal end portion of the inner tubular portion.

3. A spring type one-way clutch comprising, a tubular outer member including an inwardly extending flange at a first end of the outer member and having an opening at a second end of the outer member;

an inner member inserted in the outer member so as to be coaxial with the outer member;

a clutch spring mounted between a radially inner surface of the outer member and a radially outer surface of the inner member; and a lid closing the opening of the outer member;

wherein the inwardly extending flange of the outer member has an inner tubular portion on an inner side surface of the flange;

wherein the clutch spring comprises a large-diameter coil spring portion fitted on a radially outer surface of the inner tubular portion with an interference fit, a transition portion extending radially inwardly from a winding end point of the large-diameter coil spring portion in a spiraling pattern in a direction in which the large-diameter coil spring portion is wound, and a small-diameter coil spring portion extending from a radially inner end of the transition portion so as to be located in the large-diameter coil spring portion, wherein the small-diameter coil spring portion is wound in a direction different from the direction in which the large-diameter coil spring portion is wound, and wherein the small-diameter coil spring portion is fitted on a cylindrical radially outer surface of the inner member with an interference fit; and wherein the inner tubular portion has an axial length determined such that a distal end surface of the inner tubular portion abuts the inner side surface of the lid, or the distal end surface of the inner tubular portion axially faces the inner side surface of the lid with a minute gap left therebetween, and wherein a spiral groove is formed in the distal end surface of the inner tubular portion in which the transition portion of the clutch spring is received; and wherein the large-diameter coil spring portion of the clutch spring has a hook formed at a winding start point of the large-diameter coil spring portion and kept in engagement with the outer member.

4. A spring type one-way clutch comprising, a tubular outer member including an inwardly extending flange at a first end of the outer member and having an opening at a second end of the outer member;

an inner member inserted in the outer member so as to be coaxial with the outer member;

a clutch spring mounted between a radially inner surface of the outer member and a radially outer surface of the inner member; and a lid closing the opening of the outer member;

wherein the inwardly extending flange of the outer member has an inner tubular portion on an inner side surface of the flange;

wherein the clutch spring comprises a large-diameter coil spring portion fitted on a radially outer surface of the inner tubular portion with an interference fit, a transition portion extending radially inwardly from a winding end point of the large-diameter coil spring portion in a spiraling pattern in a direction in which the large-diameter coil spring portion is wound, and a small-diameter coil spring portion extending from a radially inner end of the transition portion so as to be located in the large-diameter coil spring portion, wherein the small-diameter coil spring portion is wound in a direction different from the direction in which the large-diameter coil spring portion is wound, and wherein the small-diameter coil spring portion is fitted on a cylindrical radially outer surface of the inner member with an interference fit; and wherein the inner tubular portion has an axial length determined such that a distal end surface of the inner tubular portion abuts the inner side surface of the lid, or the distal end surface of the inner tubular portion axially faces the inner side surface of the lid with a minute gap left therebetween, and wherein a spiral groove is formed in the distal end surface of the inner tubular portion in which the transition portion of the clutch spring is received; and wherein the outer member is configured to drive the inner member, wherein the inner member comprises a rotary shaft, wherein the one-way clutch further comprises a ratchet wheel rotatably mounted around the rotary shaft, and a ratchet pawl which can be selectively brought into and out of engagement with the ratchet wheel, thereby selectively allowing and prohibiting rotation of the ratchet wheel, and wherein the small-diameter coil spring portion has an engaging piece formed at a winding end point of the small-diameter coil spring portion and kept in engagement with the ratchet wheel.

* * * * *